United States Patent
Tao et al.

(10) Patent No.: US 11,696,320 B2
(45) Date of Patent: Jul. 4, 2023

(54) METHOD, APPARATUS AND COMPUTER MEDIUM FOR SWITCHING USER TERMINAL, AND ACCESS POINT

(71) Applicant: ARRIS Enterprises LLC, Suwanee, GA (US)

(72) Inventors: Jun Tao, Guangdong (CN); Huiling Jia, Guangdong (CN); Haijuan Wen, Guangdong (CN); Yongqiang Ye, Guangdong (CN)

(73) Assignee: ARRIS Enterprises LLC, Suwanee, GA (US)

( * ) Notice: Subject to any disclaimer, the term of this patent is extended or adjusted under 35 U.S.C. 154(b) by 128 days.

(21) Appl. No.: 17/237,910

(22) Filed: Apr. 22, 2021

(65) Prior Publication Data
US 2022/0053501 A1    Feb. 17, 2022

(30) Foreign Application Priority Data
Aug. 17, 2020    (CN) .......................... 202010825331.4

(51) Int. Cl.
*H04L 12/28*    (2006.01)
*H04W 72/542*    (2023.01)
(Continued)

(52) U.S. Cl.
CPC ......... *H04W 72/542* (2023.01); *H04W 24/08* (2013.01); *H04W 72/0453* (2013.01)

(58) Field of Classification Search
CPC .. H04B 17/309; H04W 24/08; H04W 72/085; H04W 88/08; H04W 72/542; H04W 72/0453; H04L 43/16
(Continued)

(56) References Cited

U.S. PATENT DOCUMENTS 11,140,457 B1 * 10/2021 Jordan ............. H04N 21/64707
2009/0262672 A1 * 10/2009 Sin .......................... H04L 5/143
370/297
(Continued)

FOREIGN PATENT DOCUMENTS

CN    101232713 B    1/2011

OTHER PUBLICATIONS

Arista, "Band Steering," Arista Networks, pp. 1-3, wifihelp.arista.com/post/band-steering, Jun. 2020.

*Primary Examiner* — John Pezzlo
(74) *Attorney, Agent, or Firm* — Panitch Schwarze Belisario & Nadel LLC (57) ABSTRACT

The present disclosure is directed to a method, apparatus and computer medium for switching a user terminal, and an access point. The method may be performed by an access point capable of operating in at least a first band and a second band, and comprises the following steps: in response to determining that a user terminal being in the first band of the access point satisfies a condition for inter-band switching, measuring a communication performance of the user terminal in the first band as a first metric; after the user terminal is switched from the first band to the second band of the access point, measuring a communication performance of the user terminal in the second band as a second metric; and causing the user terminal to be in the band associated with a better one of the first metric and the second metric. The user terminal can be connected to a band with a better communication performance by comparing the communication performance before and after the switching, thereby avoiding the occurrence of erroneous switching.

20 Claims, 3 Drawing Sheets

(51) Int. Cl.
  *H04W 72/0453* (2023.01)
  *H04W 24/08* (2009.01)
  *H04J 1/16* (2006.01)

(58) Field of Classification Search
  USPC .................................... 370/252, 329, 430
  See application file for complete search history.

(56) References Cited

U.S. PATENT DOCUMENTS

| | | | |
|---|---|---|---|
| 2013/0014101 A1* | 1/2013 | Ballani | H04L 67/131 718/1 |
| 2013/0064087 A1* | 3/2013 | Budic | H04W 28/0263 370/235 |
| 2017/0353865 A1* | 12/2017 | Li | H04W 16/14 |
| 2019/0036843 A1* | 1/2019 | Kakeda | H04L 5/0058 |
| 2019/0059110 A1* | 2/2019 | Zhang | H04W 72/20 |
| 2020/0120488 A1* | 4/2020 | Liu | H04W 72/04 |
| 2020/0288409 A1* | 9/2020 | Li | H04L 5/0098 |
| 2022/0045732 A1* | 2/2022 | Islam | H04L 5/0048 |
| 2022/0060221 A1* | 2/2022 | Ko | H04L 5/0051 |
| 2022/0131625 A1* | 4/2022 | Garcia | G06N 3/044 |

* cited by examiner

In response to determining that a user terminal being in the first band of the access point satisfies a condition for inter-band switching, measuring a communication performance of the user terminal in the first band as a first metric — S310

After the user terminal is switched from the first band to the second band of the access point, measuring a communication performance of the user terminal in the second band as a second metric — S320

Causing the user terminal to be in the band associated with a better one of the first metric and the second metric — S330

METHOD, APPARATUS AND COMPUTER MEDIUM FOR SWITCHING USER TERMINAL, AND ACCESS POINT

TECHNICAL FIELD

The present disclosure is related generally to a wireless network, and more particularly to a method, apparatus and computer medium for switching a user terminal, and an access point.

BACKGROUND

With the development of technologies, there are access points capable of operating in more than one band, e.g., dual-band access points capable of operating in both 2.4 GHz band and 5 GHz band. For a user terminal that is also capable of supporting these bands, it may connect to the access point via one of the 2.4 GHz band and the 5 GHz band. When a dual-band access point detects that a communication quality of a dual-band user terminal communicating on a certain band is deteriorated, it may switch the user terminal to the other band by, for example, a band steering technique, thereby providing a better communication quality for the user terminal.

During the communication between the user terminal and the access point, as the user terminal moves, the user terminal may enter the following special area of the access point: in this area, it is difficult to determine which one of the 2.4 GHz band wireless signal quality and the 5 GHz band wireless signal quality is better. For the user terminal connected to a certain band, when the access point detects that the signal strength of another band exceeds a threshold and/or a signal strength of the current band is lower than a threshold, the access point will initiate a switching operation to switch the user terminal to another band. However, the quality of communication performed by the user terminal on another band may not be as good as the quality of communication performed by the user terminal on the original band. This makes the switching operation does not provide better communication quality for the user terminal. Moreover, since it is difficult to determine which band is better in the above-mentioned special area, the user terminal may be constantly switched back and forth between multiple bands, causing a ping-pong effect.

In order to overcome the ping-pong effect, some parameters are introduced in the band steering technology to prevent the access point from frequently switching the user terminal between different bands. However, if the access point is prevented from performing further switch after the user terminal is switched from the 2.4 GHz band to the 5 GHz band with a worse communication quality, the user terminal will be kept in the worse band for a while, which greatly degrades the communication quality of the user terminal.

Therefore, it is desirable to provide a manner of enabling the user terminal to be located in a band with a better communication quality, and thus avoiding the occurrence of erroneous switching operations.

SUMMARY

Aspects of the present disclosure are directed to an access point capable of operating in at least a first band and a second band. The access point may comprise: a memory storing instructions; and a processor configured to execute the instructions stored in the memory to cause the access point to perform operations as follows. The operations may comprise: in response to determining that a user terminal being in the first band of the access point satisfies a condition for inter-band switching, measuring a communication performance of the user terminal in the first band as a first metric; after the user terminal is switched from the first band to the second band of the access point, measuring a communication performance of the user terminal in the second band as a second metric; and causing the user terminal to be in the band associated with a better one of the first metric and the second metric.

In some embodiments, for each of the first band and the second band, the access point may measure the communication performance of the user terminal in the band by: sending a request message to the user terminal being in the band, to request the user terminal to provide information related to receiving wireless signals from the band; and determining the communication performance of the user terminal in the band according to a response from the user terminal including the information.

In some embodiments, the access point may further determine the communication performance of the user terminal in the band by: sending a PING command to the user terminal being in the band; determining a packet loss rate and a transmission delay of communication made by the user terminal in the band according to a response of the user terminal to the PING command; and determining the communication performance of the user terminal in the band based on the packet loss rate and the transmission delay.

In some embodiments, the access point may determine a value obtained by a weighted sum of the packet loss rate and the transmission delay as the communication performance of the user terminal in the band, wherein a weight related to the packet loss rate may be greater than a weight related to the transmission delay.

In some embodiments, the access point may cause the user terminal to be in the band associated with the better one of the first metric and the second metric by: switching the user terminal back to the first band if the first metric is better than the second metric; and keeping the user terminal in the second band if the first metric is not better than the second metric.

In some embodiments, the access point may determine that the user terminal satisfies the condition for inter-band switching when at least one of the following conditions is satisfied: a strength of a signal received from the user terminal is below a threshold strength; a strength of a signal in the second band detected in a position of the user terminal is above a threshold strength; a noise level on a channel where the user terminal is located is above a threshold level; and a number of terminals accessed on the channel where the user terminal is located is greater than a threshold number.

Other aspects of the present disclosure are directed to a method, apparatus, and non-transitory computer readable medium for switching a user terminal. Each of them may implement the operations described above performed by the access point.

BRIEF DESCRIPTION OF THE DRAWINGS

For a better understanding of the present disclosure, and to illustrate how to implement the present disclosure, reference will now be made, by way of example, to the accompanying drawings, in which.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
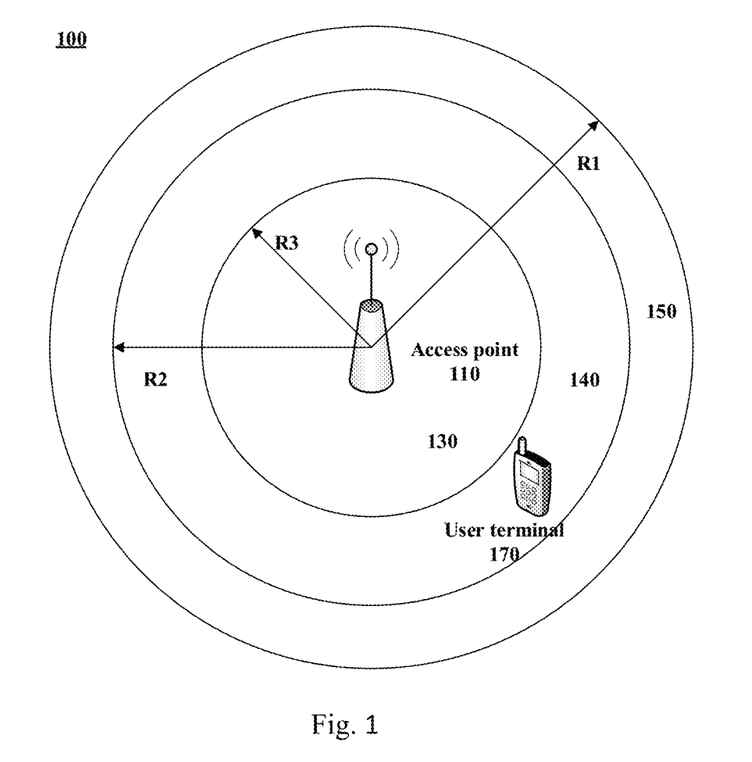
FIG. 1 is a schematic diagram illustrating a case where a user terminal is located in a boundary zone between multiple band coverages of an access point according to an embodiment of the present disclosure.

First, with reference to FIG. 1, a schematic diagram of a wireless network 100 according to an embodiment of the present disclosure is described.

An access point 110 is a wireless network access device, e.g., a Wi-Fi router, capable of operating in more than one band. In the example of FIG. 1, the access point 110 is capable of operating in a first band, such as the 2.4 GHz band, and a second band, such as the 5 GHz band. Of course, the access point 110 may also operate in more bands, and values of the bands are not limited to 2.4 GHz and 5 GHz. For simplicity of description, a dual-band access point capable of operating in the 2.4 GHz and 5 GHz bands will be described hereinafter as an example, but it is not intended that the present disclosure is applicable only to such an access point. The techniques described in this disclosure may be applied as long as the access point can switch the user terminal between the multiple bands it supports.

Figure 2:
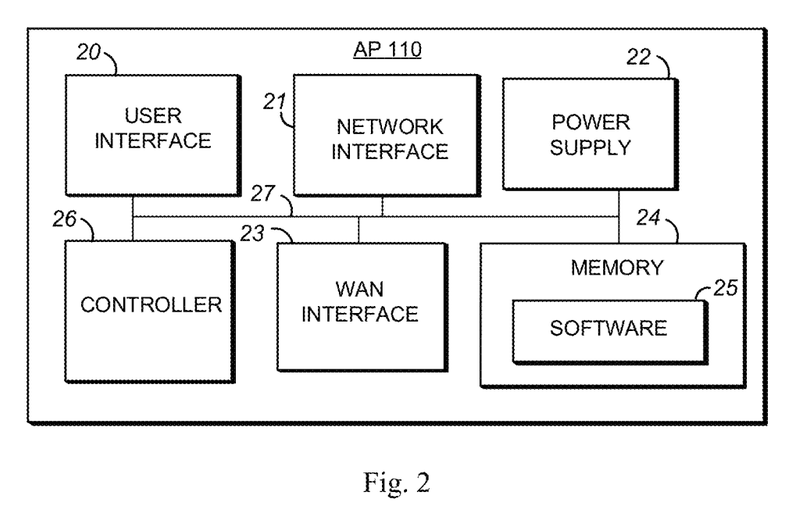
FIG. 2 is an exemplary configuration block diagram of an access point capable of operating in at least a first band and a second band according to an embodiment of the present disclosure.

FIG. 2 illustrates an exemplary configuration block diagram of the access point 110 according to an embodiment of the present disclosure.

While referred to herein as an access point (AP), the AP 110 can be, for example, a hardware electronic device that can combine the functions of a modem, an access point, and/or a router. It is also contemplated by the present disclosure that the AP 110 can include the function of, but is not limited to, a Smart Media Device (SMD) or an IP/QAM Set Top Box (STB) that is capable of decoding audio/video content, and playing OTT or MSO provided content.

As shown in FIG. 2, the AP 110 includes a user interface 20, a network interface 21, a power supply 22, a WAN interface 23, a memory 24, and a controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the AP 110. The network interface 21 may include various network cards, and circuitry implemented in software and/or hardware to enable communications with wireless extender devices and client devices using one or more wireless protocols, such as any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands, RF4CE protocol, ZigBee protocol, Z-Wave protocol, or IEEE 802.15.4 protocol.

The power supply 22 supplies power to the internal components of the AP110 through the internal bus 27. The power supply 22 can be a self-contained power source such as a battery pack with an interface to be powered through an electrical charger connected to an outlet (e.g., either directly or by way of another device). The power supply 22 can also include a rechargeable battery that can be detached allowing for replacement such as a NiCd, a NiMH, a Li-ion, or a Li-pol battery. If the AP 110 is a modem or gateway device, it can include the WAN interface 23, which can include various network cards, and circuitry implemented in software and/or hardware to enable communications between the router device and an Internet service provider or multiple systems operator (MSO).

The memory 24 includes a single memory or one or more memories or memory locations that include, but are not limited to, a Random Access Memory (RAM), a Dynamic Random Access Memory (DRAM), a Static Random Access Memory (SRAM), a Read Only Memory (ROM), an EPROM, an EEPROM, a ROM, a flash memory, logic blocks of a FPGA, hard disk, or any other various layers of memory hierarchy. The memory 24 can be used to store any type of instructions, software, or algorithm including software 25 for controlling the general functions and operations of the AP 110.

The controller 26 controls the general operations of the AP 110 as well as performs management functions related to the other devices (such as extenders and client devices) in the network. The controller 26 can include, but is not limited to, a CPU, a hardware microprocessor, a hardware processor, a multi-core processor, a single core processor, a microcontroller, an Application Specific Integrated Circuit (ASIC), a DSP, or other similar processing device capable of executing any type of instructions, algorithms, or software for controlling the operation and functions of the AP 110 in accordance with the embodiments described in the present disclosure. The controller 26 can include various implementations of digital circuitry, analog circuitry, or mixed signal (a combination of analog and digital) circuitry that perform functionalities in a computing system. The controller 26 may include, e.g., such a circuit like an Integrated Circuit (IC), portions or circuits of an individual processor core, an entire processor core, an individual processor, a programmable hardware device such as a Field Programmable Gate Array (FPGA), and/or a system including a plurality of processors.

Communication between the components (e.g., 20-22, 24, and 26) of the AP 110 may be established using the internal bus 27.

Returning to FIG. 1, usually, the access points 110 transmits wireless signal outwards with it as the center. A range covered by the wireless signal sent on the 2.4 GHz band has a radius indicated by R1, and a range covered by the wireless signal sent on the 5 GHz band has a radius indicated by R2. In an area 130 with a radius of R3, the wireless signal quality in the 5 GHz band is better than that in the 2.4 GHz band, such as higher signal strength, lower noise level, higher communication quality, etc. In an area 150 where the range with the radius R1 is larger than the range with the radius R2, the wireless signal quality in the 2.4 GHz band is better than the wireless signal quality in the 5 GHz band. In an area 140 where the range with the radius R2 is larger than the range with the radius R1, it is difficult to determine which one of the wireless signal quality in the 2.4 GHz band and the wireless signal quality in the 5 GHz band is better. In particular, since the area 140 is at the edge of the coverage of the wireless signal in the 5 GHz band, the signal strength of the 5 GHz band in this area 140 is usually not high, and it is more likely that it is around a signal strength threshold for switching from the 5 GHz band to the 2.4 GHz band. The user terminal in the area 150 is usually connected to the access point 110 through the 2.4 GHz band, and the user terminal in the area 130 is usually connected to the access point 110 through the 5 GHz band. When the user terminal is in the area 140, the user terminal in one band may be switched to another band by the access point 110.

The user terminal 170 may be an electronic device such as a mobile phone, a notebook computer, a desktop computer, a tablet computer, a printer, a TV, a game console, and the like. Due to movement, the user terminal 170 may move from the area where the wireless signal quality of the 2.4 GHz or 5 GHz band is better to the area 140, which may cause the access point 110 to perform a switching operation on the user terminal 170. Although only one user terminal is shown in FIG. 1, there may be multiple user terminals, which are connected to the access point 110 via any one of the 2.4 GHz and 5 GHz bands.

When the user terminal 170 is in the area 140, for the user terminal 170 originally connected to the 2.4 GHz band, the access point 110 may detect that the signal strength of the 5 GHz band in a position where the user terminal 170 is exceeds a threshold, and thus determining that the user terminal 170 needs to be switched to the 5 GHz band; for the user terminal 170 originally connected to the 5 GHz band, the access point 110 may detect that the signal strength of the 5 GHz band transmitted by the user terminal is lower than a threshold and/or the signal strength of the 2.4 GHz band in the position of the user terminal is above a threshold, and thus determining that the user terminal 170 needs to be switched to the 2.4 GHz band. At this time, the access point 110 switches the user terminal 170 to another band by sending a switching request to the user terminal 170, for example, using the band steering technology. However, after the user terminal 170 switches to the 2.4 GHz or 5 GHz band, its communication quality may not be as good as the communication quality before the switching, which means that the switching operation performed by the access point 110 is incorrect.

Figure 3:
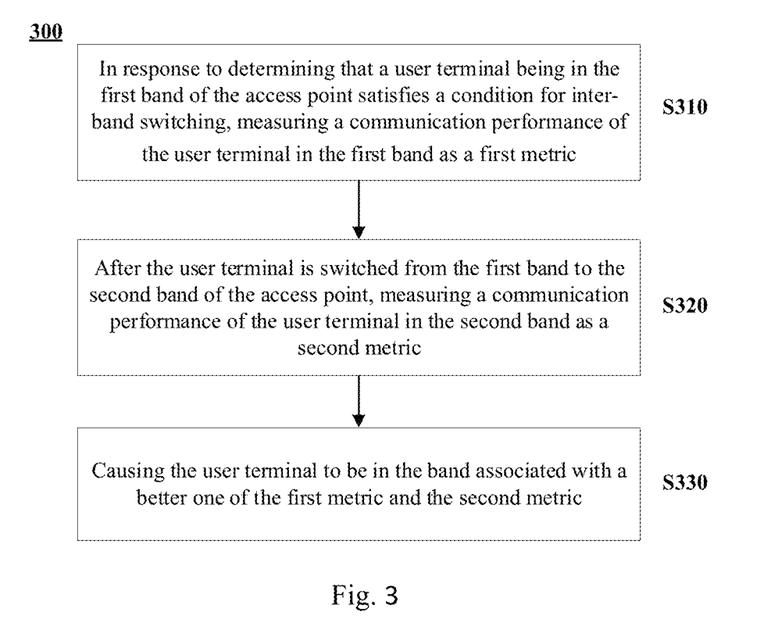
FIG. 3 is a flow chart of a method for switching a user terminal according to an embodiment of the present disclosure.

To avoid false switching of the user terminal 170 to other bands, a method 300 shown in FIG. 3 may be employed. The method 300 enables the user terminal to be connected to a band with a better communication performance based on comparison of the communication performance before and after the switching, thereby avoiding the occurrence of erroneous switching. In the description of the method 300, reference will be made to the schematic diagram shown in FIG. 1.

In S310, in response to determining that the user terminal being in the first band of the access point satisfies a condition for inter-band switching, the access point measures a communication performance of the user terminal in the first band as a first metric.

For example, the access point 110 initially communicated with the user terminal 170 via the 2.4 GHz band. As the user terminal 170 moves from the area 150 to the area 140, the access point 110 may detect that the user terminal 170 meets the condition for inter-band switching, so the user terminal 170 needs to be switched from the 2.4 GHz band to the 5 GHz band.

According to an embodiment of the present disclosure, the access point 110 may determine that the user terminal 170 satisfies the condition for inter-band switching by at least one of the following ways, and thus determining a switching operation is needed. One way is to detect the strength of the signal from the user terminal 170 by the access point 110. When the strength of the signal transmitted by the user terminal 170 in the 2.4 GHz or 5 GHz band detected by the access point 110 is lower than a predetermined threshold (e.g., −80 dBm, −90 dBm, etc.), the access point 110 determines that the user terminal 170 needs to be switched to another band. Another way is to detect the wireless signal strength on another band by the access point 110. For example, if the access point 110 detects that the 5 GHz signal strength in the position of the user terminal 170 is higher than a threshold according to the band steering technology and the like, it determines that the user terminal 170 needs to be switched from the 2.4 GHz band to the 5 GHz band. Further another way is to detect the noise level on the channel where the user terminal 170 is located by the access point 110. The spectrum resource of each band can be divided into a plurality of channels at intervals. The user terminal 170 may be in one of a plurality of channels contained in the 2.4 GHz band. In case where there is no data transmission on the channel where the user terminal 170 is located, the access point 110 may detect the noise level of the channel where the user terminal 170 is located. Alternatively, the access point may extract noise components from all signals received on the channel, thereby determining the noise level. When the noise level is above a predetermined threshold (e.g., −200 dBm, −150 dBm, etc.), it may be determined that the communication quality on the channel is deteriorated, and thus the user terminal 170 needs to be switched to another band. Yet another way is to count the number of terminals accessed on the channel where the user terminal 170 is located by the access point 110. The access point 110 may record a MAC address of a terminal that communicates on a certain channel. If the number of MAC addresses associated with the channel where the user terminal 170 is located exceeds a predetermined number (e.g., 4, 5, etc.), the access point 100 may determine that the channel is too crowded and highly competitive, and thus the signal transmitted on the channel is highly interfered, so that the user terminal 170 needs to be switched to another band. In addition to the above, other ways to determine whether the user terminal satisfies the condition for inter-band switching by detecting the channel quality are also conceivable to those skilled in the art.

After the access point 110 determines that the user terminal 170 needs to be switched from the current 2.4 GHz band to the 5 GHz band, the access point 100 does not immediately perform a switching operation, but measures the communication performance of the user terminal 170 in the 2.4 GHz band. The access point 110 may send a request message to the user terminal 170 being in the 2.4 GHz band, requesting the user terminal 170 to provide information related to receiving wireless signals from the 2.4 GHz band. For example, the access point 100 may request the user terminal 170 to provide information on a reception strength of the wireless signals, information on a bit error rate after decoding the wireless signals, information on an adjacent wireless signal reception interval, and the like. The user terminal 170 may return related information to the access point 110, from which the access point 110 determines the current communication performance of the user terminal 170. For example, different values may be given to different information, and different weights may be set, and by quantitatively characterizing the communication performance using a weighted sum of the values, a value corresponding to the current communication performance can be obtained.

For example, the access point 110 may send a PING command to the user terminal 170 being in the 2.4 GHz band. For example, when an IP address of the user terminal 170 is 10.48.2.3, the access point 110 can determine a communication state of the user terminal 170 by using a "PING 10.48.2.3" command line.

The user terminal 170 may return information such as a number of received packets, a minimum transmission delay, a maximum transmission delay, etc. in response to the PING command. The transmission delay may refer to a round trip time or half of it. From this information, the access point 110 can determine the packet loss rate and the transmission delay. For example, the packet loss rate may be equal to the number of received packets returned in response to the PING command divided by a total number of packets sent by the access point 110 to the user terminal 170 when using the PING command. The transmission delay may be an average of the minimum transmission delay and the maximum transmission delay.

The access point 110 may calculate the communication performance of the user terminal 170 being in the 2.4 GHz band based on the determined packet loss rate and transmission delay. For example, the communication performance can be calculated by the following expression:

$$F_B = \alpha \cdot 10 \cdot A_B + \beta \cdot T_B$$

Where $F_B$ represents the communication performance of a band B (here, 2.4 GHz), $A_B$ represents the packet loss rate of communication on the band B, $T_B$ represents the transmission delay (ms) of communication on the band B, and $\alpha$ and $\beta$ are parameters not less than 0 and not more than 1. $\alpha$ and $\beta$ can be set arbitrarily or as required. For example, the packet loss rate is generally considered to have a greater influence on the communication performance, and thus $\alpha$ may be set to be greater than $\beta$. Further, $\beta$ may be set to zero.

The communication performance of the user terminal 170 in the 2.4 GHz band measured by the access point 110 may be denoted as a first metric, for example $F_{2.4GHz}$.

In S320, after the user terminal is switched from the first band to the second band of the access point, the access point measures, as a second metric, the communication performance of the user terminal in the second band.

After the measurement of the communication performance of the user terminal 170 connected via the 2.4 GHz band is completed, the access point 110 temporarily switches the user terminal 170 to the 5 GHz band. "Temporarily" means that the user terminal 170 is not necessarily switched to the 5 GHz band in the end, but the user terminal 170 is switched to the 5 GHz band for measuring the corresponding communication performance, in order to help correctly perform the switching operation.

The user terminal 170, which is switched to the 5 GHz band, communicates with the access point 110 via the 5 GHz band. The access point 110 may measure the communication performance of the user terminal 170 in the 5 GHz band in a manner similar to the measurement of the communication performance described above. For example, the access point 110 may send a request message to the user terminal 170 requesting it to transmit information related to receiving wireless signals from the 5 GHz band, and determine the current communication performance, denoted as a second metric, based on the information returned by the user terminal 170. Specifically, the access point 110 may send a PING command to the user terminal 170. The IP address of the user terminal 170 may change due to a change in the communication band, or may not change. Based on the information returned by the user terminal 170 in response to the PING command, the access point may determine the packet loss rate $A_{5GHz}$ and the transmission delay $T_{5GHz}$, thereby determining the communication performance $F_{5GHz}$ of the user terminal 170 in the 5 GHz band according to the above expression.

In S330, the user terminal is caused by the access point to be in the band associated with a better one of the first metric and the second metric.

The access point 110 measures the first metric $F_{2.4GHz}$ and the second metric $F_{5GHz}$ through S310 and S320 above, respectively. By comparing the first metric and the second metric, a better one of the first metric and the second metric can be determined, and the band corresponding to the better one is the band with a better communication quality. Therefore, in order that the user terminal 170 is not erroneously switched to a band with a worse communication quality, the access point 110 connects the user terminal 170 to the band with a better communication performance.

Specifically, in the example of FIG. 1, the access point 110 originally intended to switch the user terminal 170 in the 2.4 GHz band to the 5 GHz band. If it is determined by measuring the communication performance that $F_{2.4GHz}$ is better than $F_{5GHz}$, which means that the communication performance of the original band (i.e., 2.4 GHz band) is better, then the access point 110 switches the user terminal 170 back to the original band. Otherwise, if $F_{2.4GHz}$ is not better than $F_{5GHz}$, which means that the communication performance of the target band (i.e., 5 GHz band) is better, then the access point 110 keeps the user terminal 170 in the 5 GHz band without additional operations.

Through the execution of the method 300, the access point 110 may measure communication performance in the case of switching by temporarily switching the user terminal to the target band, and may connect the user terminal on the band with a better communication performance based on comparison of the measured communication performance before and after the switching. In this way, it is possible to avoid the occurrence of erroneous switching when a switching condition is satisfied, making it difficult to deteriorate the communication quality of the user terminal due to switching.

In addition, due to the introduction of such a means of temporarily switching the band, the access point can ensure that the user terminal is connected on the band with a better communication performance by measuring the communication performance before and after the switching, and communication on an erroneous band is avoided, which not only can improve the user communication experience, but also can use resources of the user terminal and the access point for communication with better channel quality, improving the use efficiency of the resources.

After causing the user terminal 170 to be in the band associated with the better one of the first metric and the second metric, the access point 110 may detect whether the user terminal 170 satisfies the condition for inter-band switching all the time. Since it is difficult to determine which one of the 2.4 GHz band channel quality and the 5 GHz band channel quality is better in the area 140, the user terminal 170 may satisfy the condition for inter-band switching no matter which band it is located, which makes it possible for the access point 110 to continuously measure the communication performance and perform the switching, and thus greatly consuming the processing resources of the access point 110 and the user terminal 170, and further intensifying the ping-pong effect of switching the user terminal 170 back and forth between the bands.

To avoid the above problem, a timer may be provided. The timer is started by the access point 110 after S330, so that the access point 110 is prevented from detecting whether the user terminal 170 satisfies the condition for inter-band switching before the timer expires. The timer needs to be started only after the measurement operations in S310 and S320 are completed, and the timer is not started immediately upon any switching operation. Specifically, after the user terminal is temporarily switched to the target band, the timer is not started. The timer is started immediately after the communication performance of the target band is determined to be better. If the communication performance of the original band is determined to be better, the timer is started after the user terminal is further switched back to the original band. The timer is not used for periodic polling of the channel, but rather prevents the access point from detecting the condition for inter-band switching before the timer expires.

Through the execution of the method 300, the user terminal will be connected on the band with a better communication performance, so it is not necessary to continuously detect the communication quality of the user terminal and perform switching on multiple bands with poor channel quality. A predetermined duration of 1 minute, 2 minutes, or the like may be set for the timer, which is started immediately after the execution of S330. It should be noted that the timer will be started regardless of whether the user terminal remains in the original band or is formally switched to the target band after the current measurement period. Before the timer expires, the access point stops detecting whether the user terminal satisfies the condition for inter-band switching. This may prevent frequent judgement as to whether the user terminal needs to be switched between multiple bands, and thus can save processing resources for the access point and the user terminal.

Figure 4:
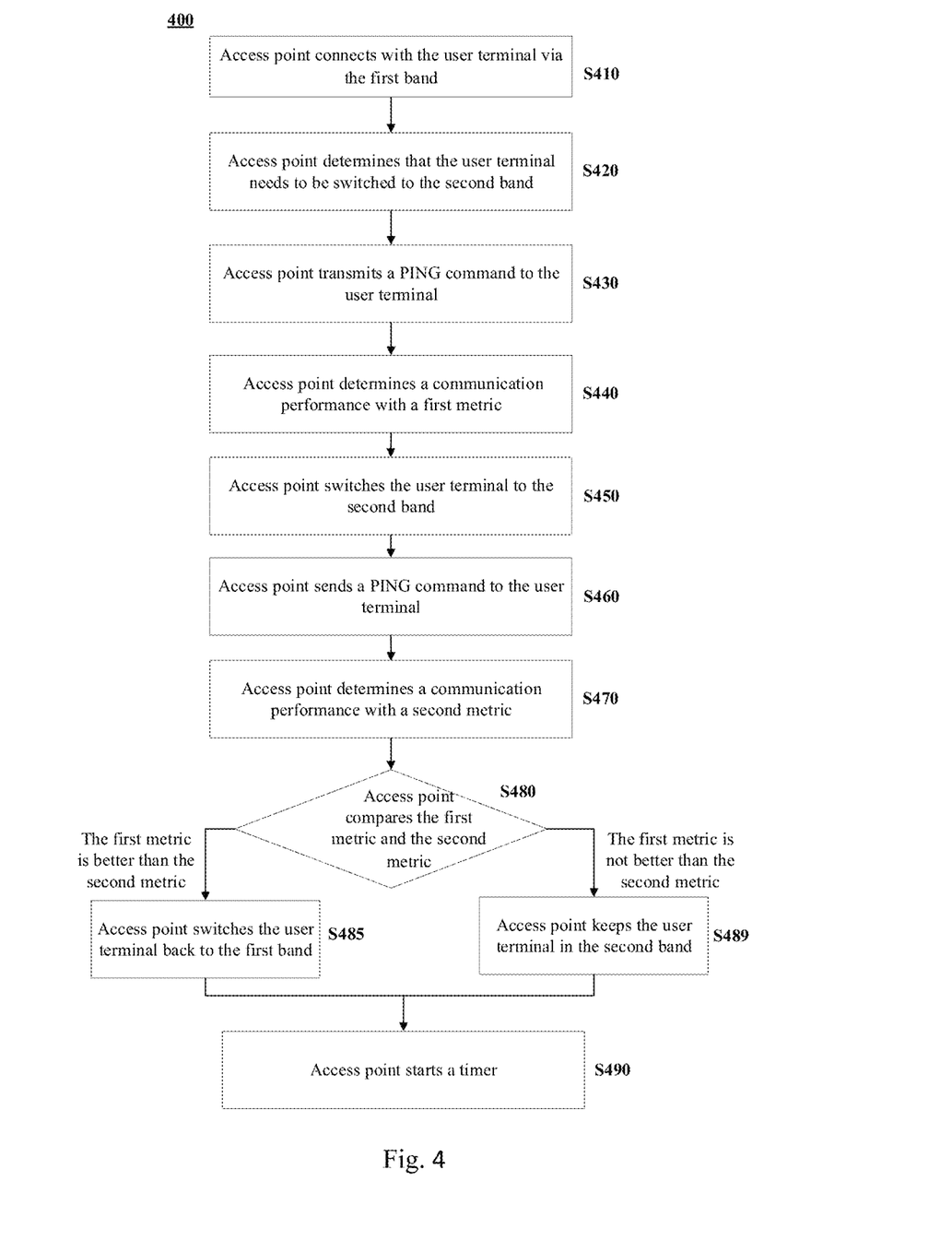
FIG. 4 is a flow chart of another method for switching a user terminal according to an embodiment of the present disclosure.

Next, a flow chart of a method 400 for switching a user terminal is described in more detail with reference to FIG. 4. In the description of the method 400, reference is still made to the schematic diagram shown in FIG. 1 for a detailed description.

In S410, the access point 110 connects with the user terminal 170 via the first band, such as the 2.4 GHz band.

In S420, the access point 110 detects that for example the strength of the signal from the user terminal 170 is below a threshold, and/or a signal strength in the second band such as 5 GHz band in the position of the user terminal 170 is higher than a threshold, and then determines that the user terminal 170 needs to be switched to the second band.

In S430, the access point 110 transmits a PING command to the user terminal 170.

In S440, the access point 110 determines, according to a response from the user terminal 170, a packet loss rate and a transmission delay of communication of the user terminal 170 in the 2.4 GHz band, and determines a communication performance with a first metric based on the packet loss rate and the transmission delay.

In S450, the access point 110 switches the user terminal 170 to the second band such as the 5 GHz band, by means of band steering.

In S460, the access point 110 sends a PING command to the user terminal 170.

In S470, the access point 110 determines, according to a response from the user terminal 170, a packet loss rate and a transmission delay of communication of the user terminal 170 on the 5 GHz band, and determines a communication performance with a second metric based on the packet loss rate and the transmission delay.

In S480, the access point 110 compares the first metric and the second metric, e.g., a relationship in magnitude between the values calculated according to the above expression. If the first metric is better than the second metric, the method 400 proceeds to S485, and if the first metric is not better than the second metric, the method proceeds to S489.

In S485, the access point 110 switches the user terminal 170 back to the 2.4 GHz band.

In S489, the access point 110 keeps the user terminal 170 in the 5 GHz band.

In S490, the access point 110 starts a timer, and does not detect the strength of the signal from the user terminal 170 and/or signal strength from another band in the position of the user terminal 170 until the timer expires.

Through the execution of the method 400, by measuring and comparing the communication performance before and after the temporary switching by means of the temporary switching, it is possible to prevent the access point from erroneously performing the switching operation and to ensure that the user terminal is connected on a better band. In addition, by using the timer, frequently judging whether the user terminal needs to be switched between multiple bands can be avoided, and the processing resources for the access point and the user terminal are saved.

The present disclosure may be implemented as any combination of an apparatus, a system, an integrated circuit, and a computer program on a non-transitory computer readable medium. The one or more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described above and in the drawings. For example, the one or more memories store software or algorithms with executable instructions and the one or more processors can execute a set of instructions of the software or algorithms in association, to correctly switch the user terminal in any number of wireless networks in accordance with the embodiments described in the present disclosure.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer readable medium refers to any computer program product, apparatus or device, such as a magnetic disk, optical disk, solid-state storage device, memory, and programmable logic devices (PLDs), used to provide machine instructions or data to a programmable data processor, including a computer readable medium that receives machine instructions as a computer-readable signal.

By way of example, a computer readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the present disclosure. Various embodiments may omit, substitute, or add various procedures or components as appropriate. For instance, features described with respect to certain embodiments may be combined in other embodiments.

Similarly, while operations are depicted in the drawings in a particular order, this should not be understood as requiring that such operations be performed in the particular order shown or in sequential order, or that all illustrated operations be performed, to achieve desirable results. In some cases, multitasking and parallel processing may be advantageous.

What we claim is:

1. An access point capable of operating in at least a first band and a second band, comprising:
a memory storing instructions; and
a processor configured to execute the instructions stored in the memory to cause the access point to perform operations comprising:
in response to determining that a user terminal being in the first band of the access point satisfies a condition for inter-band switching, measuring a communication performance of the user terminal in the first band as a first metric;
after the user terminal is switched from the first band to the second band of the access point, measuring a communication performance of the user terminal in the second band as a second metric; and
causing the user terminal to be in the band associated with a better one of the first metric and the second metric.

2. The access point according to claim 1, wherein for each of the first band and the second band, the processor is further configured to execute the instructions stored in the memory to cause the access point to perform an operation of:
sending a request message to the user terminal being in the band, to request the user terminal to provide information related to receiving wireless signals from the band; and
determining the communication performance of the user terminal in the band according to a response from the user terminal including the information.

3. The access point according to claim 2, wherein the processor is further configured to execute the instructions stored in the memory to cause the access point to perform an operation of:
sending a PING command to the user terminal being in the band;
determining a packet loss rate and a transmission delay of communication made by the user terminal in the band according to a response of the user terminal to the PING command; and
determining the communication performance of the user terminal in the band based on the packet loss rate and the transmission delay.

4. The access point according to claim 3, wherein the processor is further configured to execute the instructions stored in the memory to cause the access point to perform an operation of:
determining a value obtained by a weighted sum of the packet loss rate and the transmission delay as the communication performance of the user terminal in the band, wherein a weight related to the packet loss rate is greater than a weight related to the transmission delay.

5. The access point according to claim 1, wherein the processor is further configured to execute the instructions stored in the memory to cause the access point to perform an operation of:
switching the user terminal back to the first band if the first metric is better than the second metric; and
keeping the user terminal in the second band if the first metric is not better than the second metric.

6. The access point according to claim 1, wherein the processor is further configured to execute the instructions stored in the memory to cause the access point to perform an operation of:
starting a timer after causing the user terminal to be in the band associated with the better one of the first metric and the second metric, so that the access point is prevented from detecting whether the user terminal satisfies the condition for inter-band switching before the timer expires.

7. The access point according to claim 1, wherein it is determined that the user terminal satisfies the condition for inter-band switching when at least one of the following conditions is satisfied:
a strength of a signal received from the user terminal is below a threshold strength;
a strength of a signal in the second band detected in a position of the user terminal is above a threshold strength;
a noise level on a channel where the user terminal is located is above a threshold level; and
a number of terminals accessed on the channel where the user terminal is located is greater than a threshold number.

8. A method for switching a user terminal, comprising
in response to determining that a user terminal being in a first band of an access point satisfies a condition for inter-band switching, measuring, by the access point, a communication performance of the user terminal in the first band as a first metric;
after the user terminal is switched from the first band to a second band of the access point, measuring, by the access point, a communication performance of the user terminal in the second band as a second metric; and
causing, by the access point, the user terminal to be in the band associated with a better one of the first metric and the second metric.

9. The method according to claim 8, wherein for each of the first band and the second band, the measuring, by the access point, the communication performance of the user terminal in the band comprises:
sending, by the access point, a request message to the user terminal being in the band, to request the user terminal to provide information related to receiving wireless signals from the band; and
determining, by the access point, the communication performance of the user terminal in the band according to a response from the user terminal including the information.

10. The method according to claim 9, wherein the measuring, by the access point, the communication performance of the user terminal in the band comprises:
sending, by the access point, a PING command to the user terminal being in the band;
determining, by the access point, a packet loss rate and a transmission delay of communication made by the user terminal in the band according to a response of the user terminal to the PING command; and
determining, by the access point, the communication performance of the user terminal in the band based on the packet loss rate and the transmission delay.

11. The method according to claim 10, wherein the determining, by the access point, the communication performance of the user terminal in the band based on the packet loss rate and the transmission delay comprises:
determining a value obtained by a weighted sum of the packet loss rate and the transmission delay as the communication performance of the user terminal in the band, wherein a weight related to the packet loss rate is greater than a weight related to the transmission delay.

12. The method according to claim 8, wherein the causing, by the access point, the user terminal to be in the band associated with the better one of the first metric and the second metric comprises:
switching, by the access point, the user terminal back to the first band if the first metric is better than the second metric; and
keeping, by the access point, the user terminal in the second band if the first metric is not better than the second metric.

13. The method according to claim 8, wherein after causing, by the access point, the user terminal to be in the band associated with the better one of the first metric and the second metric, the method further comprises:
starting, by the access point, a timer, so that the access point is prevented from detecting whether the user terminal satisfies the condition for inter-band switching before the timer expires.

14. The method according to claim 8, wherein it is determined by the access point that the user terminal satisfies the condition for inter-band switching when at least one of the following conditions is satisfied:
a strength of a signal received from the user terminal is below a threshold strength;
a strength of a signal in the second band detected in a position of the user terminal is above a threshold strength;
a noise level on a channel where the user terminal is located is above a threshold level; and
a number of terminals accessed on the channel where the user terminal is located is greater than a threshold number.

15. A non-transitory computer readable medium storing instructions which, when executed by a processor, cause the processor to perform operations comprising:
in response to determining that a user terminal being in a first band of an access point satisfies a condition for inter-band switching, measuring a communication performance of the user terminal in the first band as a first metric;
after the user terminal is switched from the first band to a second band of the access point, measuring a communication performance of the user terminal in the second band as a second metric; and
causing the user terminal to be in the band associated with a better one of the first metric and the second metric.

16. The non-transitory computer readable medium according to claim 15, wherein for each of the first band and the second band, the instructions are executed by the processor to cause the processor to further perform an operation of:
sending a PING command to the user terminal being in the band;
determining a packet loss rate and a transmission delay of communication made by the user terminal in the band according to a response of the user terminal to the PING command; and
determining the communication performance of the user terminal in the band based on the packet loss rate and the transmission delay.

17. The non-transitory computer readable medium according to claim 16, wherein the instructions are executed by the processor to cause the processor to further perform an operation of:
determining a value obtained by a weighted sum of the packet loss rate and the transmission delay as the communication performance of the user terminal in the band, wherein a weight related to the packet loss rate is greater than a weight related to the transmission delay.

18. The non-transitory computer readable medium according to claim 15, wherein the instructions are executed by the processor to cause the processor to further perform an operation of:
switching the user terminal back to the first band if the first metric is better than the second metric; and
keeping the user terminal in the second band if the first metric is not better than the second metric.

19. The non-transitory computer readable medium according to claim 15, wherein the instructions are executed by the processor to cause the processor to further perform an operation of:
starting a timer after causing the user terminal to be in the band associated with the better one of the first metric and the second metric, so that the access point is prevented from detecting whether the user terminal satisfies the condition for inter-band switching before the timer expires.

20. An apparatus for switching a user terminal, comprising means for performing steps of the method according to claim 8.

\* \* \* \* \*